US007338570B2

(12) United States Patent
Terakura

(10) Patent No.: US 7,338,570 B2
(45) Date of Patent: Mar. 4, 2008

(54) METHOD FOR PRODUCING INKJET HEAD AND INKJET HEAD

(75) Inventor: Tatsuo Terakura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 167 days.

(21) Appl. No.: 11/006,717

(22) Filed: Dec. 8, 2004

(65) Prior Publication Data

US 2005/0157097 A1 Jul. 21, 2005

(30) Foreign Application Priority Data

Dec. 8, 2003 (JP) ............................ 2003-408839

(51) Int. Cl.
*B32B 37/00* (2006.01)
*B29C 65/00* (2006.01)

(52) U.S. Cl. ........................ 156/83; 347/72; 29/25.35; 29/890.1; 156/322

(58) Field of Classification Search .................. 156/83, 156/307.3, 307.7, 322; 347/68, 71, 72; 29/25.35, 29/890.1
See application file for complete search history.

(56) References Cited

U.S. PATENT DOCUMENTS

| | | | | |
|---|---|---|---|---|
| 2,683,105 | A * | 7/1954 | Forbes et al. | 156/312 |
| 5,196,241 | A * | 3/1993 | Burke et al. | 427/444 |
| 6,378,994 | B1 | 4/2002 | Ueda et al. | |
| 2002/0175976 | A1* | 11/2002 | Okuda | 347/71 |

FOREIGN PATENT DOCUMENTS

| | | | |
|---|---|---|---|
| EP | 1 338 421 | A2 | 8/2003 |
| EP | 1 366 903 | A1 | 12/2003 |
| JP | 04345858 | A * | 12/1992 |
| JP | A 06-325685 | | 11/1994 |
| JP | 10100416 | A * | 4/1998 |
| JP | A 2000-190511 | | 7/2000 |
| JP | A 2003-136736 | | 5/2003 |
| JP | A 2003-237078 | | 8/2003 |

OTHER PUBLICATIONS

Human translation of JP 10100416 Oct. 2007.*
Machine translation for JP 10100416, Jan. 2007.*
Abstract for JP 10100416, 1998.*
Abstract for JP 04345858, 1992.*

* cited by examiner

*Primary Examiner*—John L Goff
(74) *Attorney, Agent, or Firm*—Oliff & Berridge, PLC

(57) ABSTRACT

A method of producing an inkjet head includes producing a flow path unit that includes plural ink flow paths that reach inkjet nozzles through pressure chambers; producing an actuator unit that has a thermal expansion coefficient different from that of the flow path unit, includes a piezoelectric ceramic sheet; laminating the flow path unit and the actuator unit through a heat-curable adhesive agent; heating the flow path unit and the actuator unit to a predetermined temperature; applying pressure on the flow path unit and the actuator unit against each other through the heat-curable adhesive agent, after the flow path unit and the actuator unit are thermally expanded to maximum sizes at the predetermined temperature and before the heat-curable adhesive agent is cured; and releasing the pressure applied on the flow path unit and the actuator unit after the heat-curable adhesive agent is cured.

18 Claims, 12 Drawing Sheets

METHOD FOR PRODUCING INKJET HEAD AND INKJET HEAD

BACKGROUND OF THE INVENTION

1. Field of the Invention

The present invention relates to a method for producing an inkjet head by laminating two units having different thermal expansion coefficients to each other and the inkjet head.

2. Description of the Related Art

An inkjet head produced by laminating a flow path unit and an actuator unit to each other has been described in JP-A-2003-237078 (FIGS. 1 to 4). Ink flow paths having nozzles and pressure chambers respectively are formed in the flow path unit. The actuator unit has a size covering the pressure chambers. The actuator unit includes a plurality of piezoelectric ceramic sheets, which are electric insulators. Some of the piezoelectric ceramic sheets are sandwiched between electrodes disposed on opposite sides. In a process of production, the portion of the piezoelectric ceramic sheets sandwiched between the electrodes serves as a polarized active portion, when a high voltage is applied there to. In the actuator unit, such active portions are formed for the pressure chambers respectively. When the two electrodes on opposite sides of each active portion are made different electric potentials, the active portion stretches in the direction of the thickness of each sheet. When pressure is applied on ink in the pressure chamber because of reduction in volume of the pressure chamber due to the stretching of the active portion, ink is jetted from the nozzle communicating with the pressure chamber. In this type inkjet head, a large number of electrodes can be arranged densely on each piezoelectric ceramic sheet because the piezoelectric ceramic sheet has a size covering the plurality of pressure chambers. For this reason, pressure chambers can be arranged so densely as to face electrodes respectively, so that high-resolution printing can be achieved.

Each active portion and two electrodes on opposite sides of the active portion form a capacitor. As the capacitance of the active portion increases, the amount of expansion/contraction of the active portion increases. Accordingly, as the capacitance of the active portion increases, the speed of ink jetted from a nozzle corresponding to the active portion increases.

In the aforementioned inkjet head, the flow path unit and the actuator unit are generally laminated each other by an adhesive agent. In the existing situation, a heat-curable adhesive agent is used as the adhesive agent because it is excellent in ink resistance, short in curing time and small in variation of thickness after curing due to low viscosity just before bonding.

SUMMARY OF THE INVENTION

The present inventor has found that the speed of ink jetted from each nozzle varies according to a corresponding position of the nozzle in the actuator unit in the aforementioned inkjet head in which two units are laminated each other by a heat-curable adhesive agent. This fact will be described with reference to FIGS. 12 and 13. FIG. 12 is a plan view of an actuator unit included in the inkjet head described in JP-A-2003-237078. The actuator unit 201 is shaped like a trapezoid in plan view and has a center 202 of gravity. As an example of the phenomenon found by the present inventor, that is, as an example of the phenomenon that the speed of ink jetted from the nozzle varies according to the position of the nozzle in the actuator unit, the speed of ink jetted from the nozzle depends on the distance of the corresponding position of the nozzle in the actuator unit 201 from the center 202 of gravity. In detail, the speed of ink jetted from the nozzle decreases as the distance of the corresponding position of the nozzle in the actuator unit 201 from the center 202 of gravity increases. FIG. 13 is a graph showing the relation between the distance from the center 202 of gravity of the actuator unit and change (%) in capacitance of each active portion before and after bonding. As represented by the curve 210 in FIG. 13, change (%) in capacitance decreases as the distance from the center 202 of gravity increases. Such variation in ink jet speed causes quality degradation of a printed image.

Therefore, an object of the invention is to reduce variation in speed of ink jetted from each nozzle.

As a result of an eagerly investigated research, the present inventor has found that the aforementioned position dependence of ink jet speed is caused by a difference in thermal expansion coefficient between the flow path unit and the actuator unit. The cause of the position dependence of ink jet speed found by the present inventor will be described below.

Generally, the flow path unit is made of a metal material such as SUS430 from the point of view of ink resistance and processability. On the other hand, the actuator unit contains piezoelectric ceramic sheets considerably lower in thermal expansion coefficient than the flow path unit, as main components. At the time of bonding the flow path unit and the actuator unit, pressure must be applied on a pair of pressing members in directions of pressing the flow path unit and the actuator unit against each other to keep the thickness of the heat-curable adhesive agent constant in the condition that the pair of pressing members clamp the flow path unit and the actuator unit. On this occasion, in the existing situation, while pressure is applied on the flow path unit and the actuator unit, the flow path unit and the actuator unit are heated to a temperature not lower than the curing temperature of the heat-curable adhesive agent. After the heat-curable adhesive agent is cured, the pressure is released. That is, the actuator unit is bound to the flow path unit by a high pressure at the time of heating. In this case, binding force varies according to the position in the actuator unit because pressure is not evenly applied on the whole of the actuator unit. This variation becomes remarkable as the area of the actuator unit increases. For this reason, in the actuator unit containing piezoelectric ceramic sheets considerably smaller in thermal expansion coefficient than the flow path unit, the position (e.g. the position near the center of gravity of the actuator unit) bound by a high pressure hard to escape the difference in amount of expansion between the two units as a displacement along the interface between the two units stretches largely in the planar direction while pulled by the flow path unit. On the other hand, the position bound by a low pressure stretches slightly in accordance with the thermal expansion coefficient of the actuator unit per se because the displacement along the interface between the two units is generated in the position.

At the time of cooling after curing of the heat-curable adhesive agent, the flow path unit and the actuator unit contract by the same length regardless of the difference in thermal expansion coefficient between the two units because the two units are bonded to each other by the cured heat-curable adhesive agent so as not to be displaced from each other. On the other hand, as described above, the amount of expansion of the actuator unit at the time of heating varies so that the position bound by a high pressure stretches largely. For this reason, the compression stress applied on the actuator unit after the temperature returns to an ordinary temperature varies so that lower compression stress is applied on the position bound by a higher pressure. In other words, the position bound by a lower pressure at the time of heating is pulled by the flow path unit so as to contract largely after the temperature returns to an ordinary temperature, so that higher compression stress is applied on the position. Because the compression stress varies according to the position, the capacitance of the active portion varies according to the position. This is because capacitance is decided on the basis of dielectric constant, electrode area and thickness and because the thickness varies according to compression stress. As a result, the speed of ink jetted from a large number of nozzles in a region facing a single actuator unit varies.

According to one embodiment of the invention, a method of producing an inkjet head, includes producing a flow path unit that includes a plurality of ink flow paths that reach inkjet nozzles through pressure chambers; producing an actuator unit that has a thermal expansion coefficient different from that of the flow path unit, includes a piezoelectric ceramic sheet having a size covering the pressure chambers, and gives jetting energy to ink in the pressure chambers; laminating the flow path unit and the actuator unit to each other through a heat-curable adhesive agent; heating the flow path unit and the actuator unit to a predetermined temperature, which is equal to or larger than a curing temperature of the heat-curable adhesive agent; applying pressure on the flow path unit and the actuator unit in a direction of pressing the flow path unit and the actuator unit against each other through the heat-curable adhesive agent, after the flow path unit and the actuator unit are thermally expanded to maximum sizes at the predetermined temperature and before the heat-curable adhesive agent is cured; and releasing the pressure applied on the flow path unit and the actuator unit after the heat-curable adhesive agent is cured.

With this method, in the condition that the temperature returns to an ordinary temperature after bonding, almost uniform compression stress is applied on the actuator unit regardless of the position. Accordingly, variation in the speed of ink jetted from nozzles provided in different positions in the actuator unit can be reduced. Accordingly, the production yield of the actuator unit can be improved.

According to one embodiment of the invention, a method of producing an inkjet head includes producing a flow path unit that includes a plurality of ink flow paths that reach ink jet nozzles through pressure chambers; producing an actuator unit that has a thermal expansion coefficient different from that of the flow path unit, includes a piezoelectric ceramic sheet having a size covering the pressure chambers, and gives jetting energy to ink in the pressure chambers; laminating the flow path unit and an actuator unit to each other through a heat-curable adhesive agent; heating the flow path unit and the actuator unit to a predetermined temperature, which is equal to or larger than a curing temperature of the heat-curable adhesive agent; applying pressure on the flow path unit and the actuator unit in a direction of pressing the flow path unit and the actuator unit against each other through the heat-curable adhesive agent, after temperatures of the flow path unit and the actuator unit is saturated and before viscosity index of the heat-curable adhesive agent reaches a minimum; and releasing the pressure applied on the flow path unit and the actuator unit after the heat-curable adhesive agent is cured.

According to one embodiment of the invention, an inkjet head includes a flow path unit, an actuator unit, a common electrode, and a plurality of individual electrodes. The flow path unit includes a plurality of ink flow paths that reach ink jet nozzles through pressure chambers. The actuator unit has a thermal expansion coefficient different from that of the flow path unit, includes a piezoelectric ceramic sheet having a size covering the pressure chambers, and gives jetting energy to ink in the pressure chambers. The plurality of individual electrodes are provided for the pressure chambers, respectively. An active portion is formed of the common electrode, each of the individual electrodes, and a portion of the piezoelectric ceramic sheet between the common electrode and each of the individual electrodes. Capacitances of the active portions have standard deviation within 1% of an average value of the capacitances of the active portions.

see paragraph 0082

DETAILED DESCRIPTION OF THE PREFERRED EMBODIMENTS

A preferred embodiment of the invention will be described below with reference to the drawings.

<Overall Structure of Head>

Figure 1:
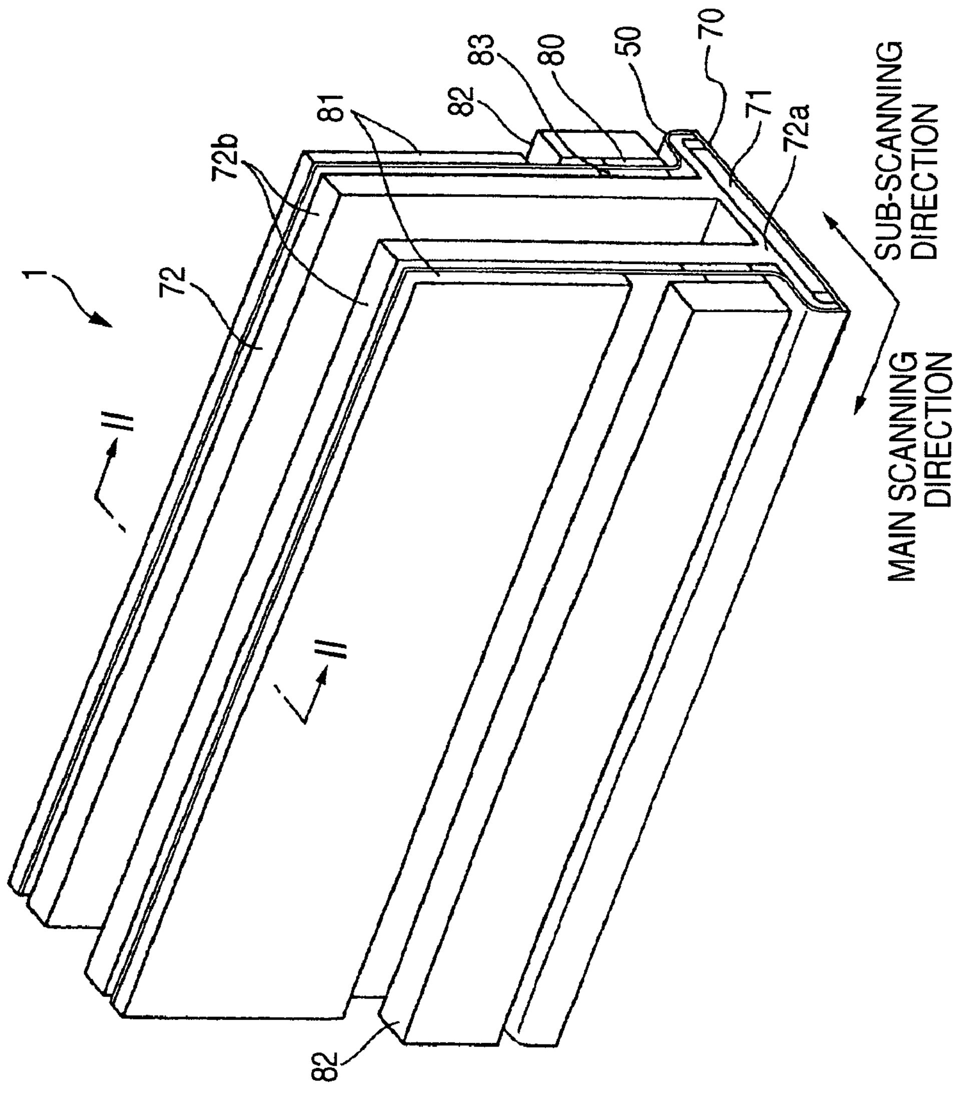
FIG. 1 is a perspective view showing the external appearance of an inkjet head produced according to an embodiment of the invention.
Figure 2:
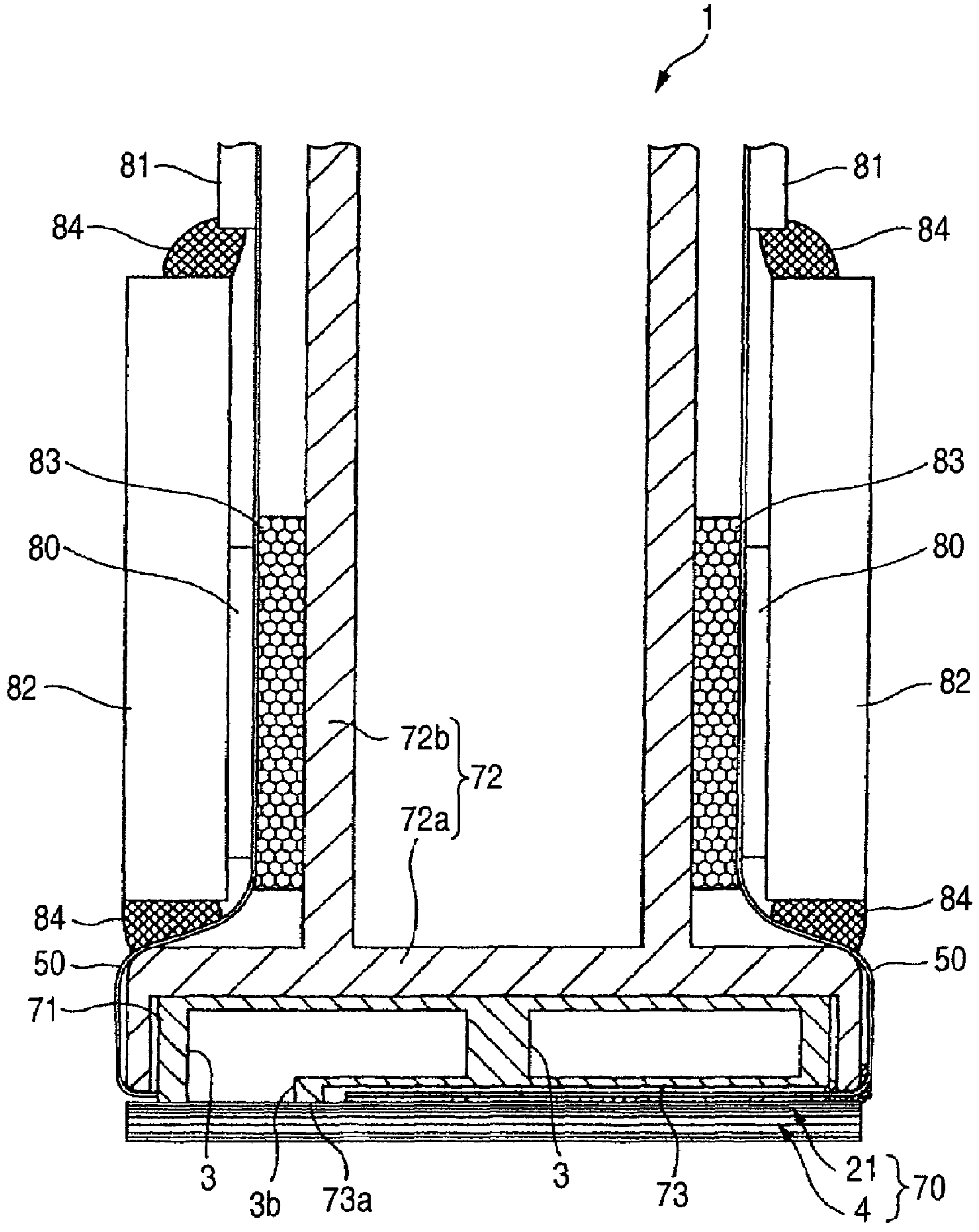
FIG. 2 is a sectional view of the inkjet head depicted in FIG. 1.

An inkjet head produced by a producing method according to an embodiment of the invention will be described. FIG. 1 is a perspective view of the inkjet head 1 according to this embodiment. FIG. 2 is a sectional view taken along the line II-II in FIG. 1. The inkjet head 1 includes a head body 70, and a base block 71. The head body 70 extends in a main scanning direction for jetting ink toward a sheet of paper and is shaped like a rectangle in plan view. The base block 71 is a reservoir unit having two ink reservoirs 3, which are formed so as to be arranged above the head body 70 and serve as flow paths of ink supplied to the head body 70.

The head body 70 includes a flow path unit 4, and a plurality of actuator units 21 bonded to an upper surface of the flow path unit 4 by an epoxy heat-curable adhesive agent. Ink flow paths are formed in the flow path unit 4. The flow path unit 4 and the actuator units 21 are configured in such a manner that a plurality of thin sheets are laminated and bonded to one another. A flexible printed circuit (FPC) 50, which is a feeder member, is soldered to upper surfaces of the actuator units 21 and led to the left or right.

Figure 3:
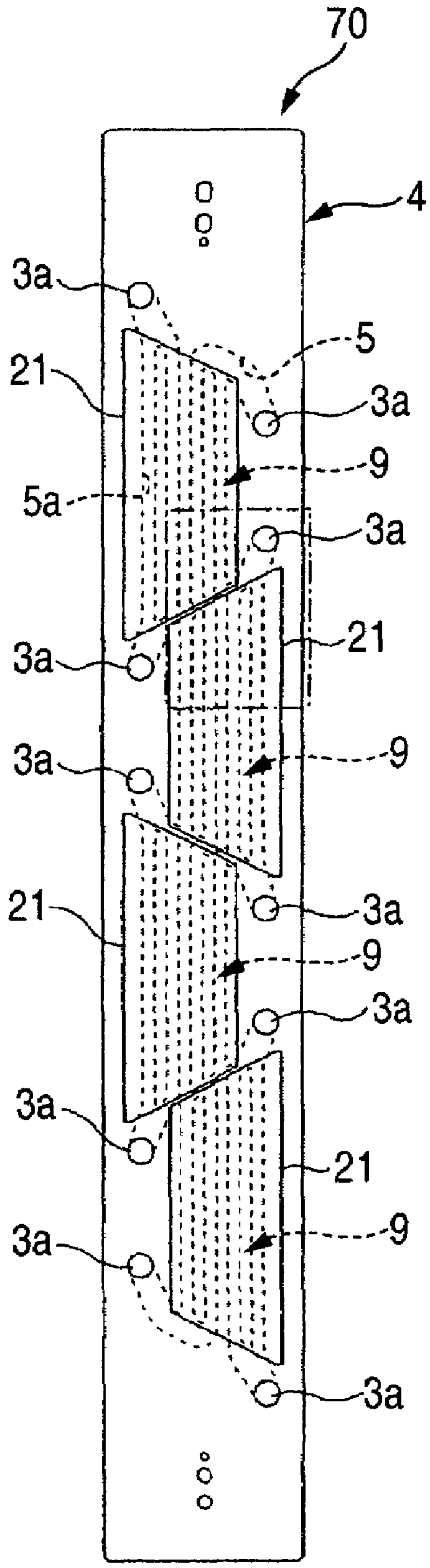
FIG. 3 is a plan view of a head body included in the inkjet head depicted in FIG. 1.

FIG. 3 is a plan view of the head body 70. As shown in FIG. 3, the flow path unit 4 has a rectangular planar shape extending in one direction (main scanning direction). In FIG. 3, a manifold flow path 5, which is a common ink chamber provided in the flow path unit 4, is shown by the broken line. Ink from the ink reservoirs 3 of the base block 71 is supplied into the manifold flow path 5 through a plurality of openings 3*a*. The manifold flow path 5 branches into a plurality of sub-manifold flow paths 5*a* extending in parallel to the lengthwise direction of the flow path unit 4.

Four actuator units 21 each having a trapezoidal planar shape are bonded to the upper surface of the flow path unit 4 so as to be arranged zigzag in two rows to avoid the openings 3*a*. Opposite parallel sides (upper and lower sides) of each actuator unit 21 are arranged along the lengthwise direction of the flow path unit 4. Oblique sides of adjacent actuator units 21 partially overlap each other in the widthwise direction of the flow path unit 4.

A lower surface of the flow path unit 4 facing the bonding region of the actuator units 21 is provided as an ink jet region in which a large number of nozzles 8 (see FIG. 5) are arranged in the form of a matrix. Pressure chamber groups 9 are formed in a front surface of the flow path unit 4 facing the actuator units 21. In each pressure chamber group 9, a large number of pressure chambers 10 (see FIG. 5) are arranged in the form of a matrix. In other words, each actuator unit 21 has a size covering a large number of pressure chambers 10.

Referring back to FIG. 2, the base block 71 is made of a metal material such as stainless steel. Each of the ink reservoirs 3 in the base block 71 is an almost rectangular parallelepiped hollow region formed along the lengthwise direction of the base block 71. The ink reservoir 3 communicates with an ink tank (not shown) through an opening (not shown) provided at an end of the ink reservoir 3, so that the ink reservoir 3 is always filled with ink. In the ink reservoir 3, pairs of openings 3*b* are provided along the extending direction of the ink reservoir 3 so zigzag as to be connected to the openings 3*a* in regions in which the actuator units 21 are not provided.

A lower surface 73 of the base block 71 is formed so that portions 73*a* of the lower surface 73 near the openings 3*b* project downward from their surroundings. The base block 71 is formed so that only the portions 73*a* of the lower surface 73 near the openings 3*b* touch the flow path unit 4. Accordingly, other regions than the portions 73*a* of the lower surface 73 of the base block 71 near the openings 3*b* are isolated from the head body 70. The actuator units 21 are disposed in the isolated regions.

The base block 71 is bonded and fixed into a concave portion formed in a lower surface of a grip 72*a* of a holder 72. The holder 72 includes a grip 72*a*, and a pair of flat plate-like protrusions 72*b* extending from an upper surface of the grip 72*a* in a direction perpendicular to the grip 72*a* with a predetermined distance therebetween. FPCs 50 bonded to the actuator units 21 are arranged along surfaces of the protrusions 72*b* of the holder 72 through an elastic member 83 such as sponge, respectively. Driver ICs 80 are disposed on the FPCs 50 arranged on the surfaces of the protrusions 72*b* of the holder 72. The FPCs 50 are electrically connected to the driver ICs 80 and the actuator units 21 by soldering so that driving signals output from the driver ICs 80 can be transmitted to the actuator units 21 of the head body 70.

Heat sinks 82 each substantially shaped like a rectangular parallelepiped are closely contacted with outer surfaces of the driver ICs 80 so that heat generated in the driver ICs 80 can be scattered and lost efficiently. Substrates 81 are disposed above the driver ICs 80 and the heat sinks 82, and on the outside of the FPCs 50. Upper surfaces of the heat sinks 82 are bonded to the substrates 81 by sealing members 84. Lower surfaces of the heat sinks 82 are also bonded to the FPCs 50 by sealing members 84.

Figure 4:
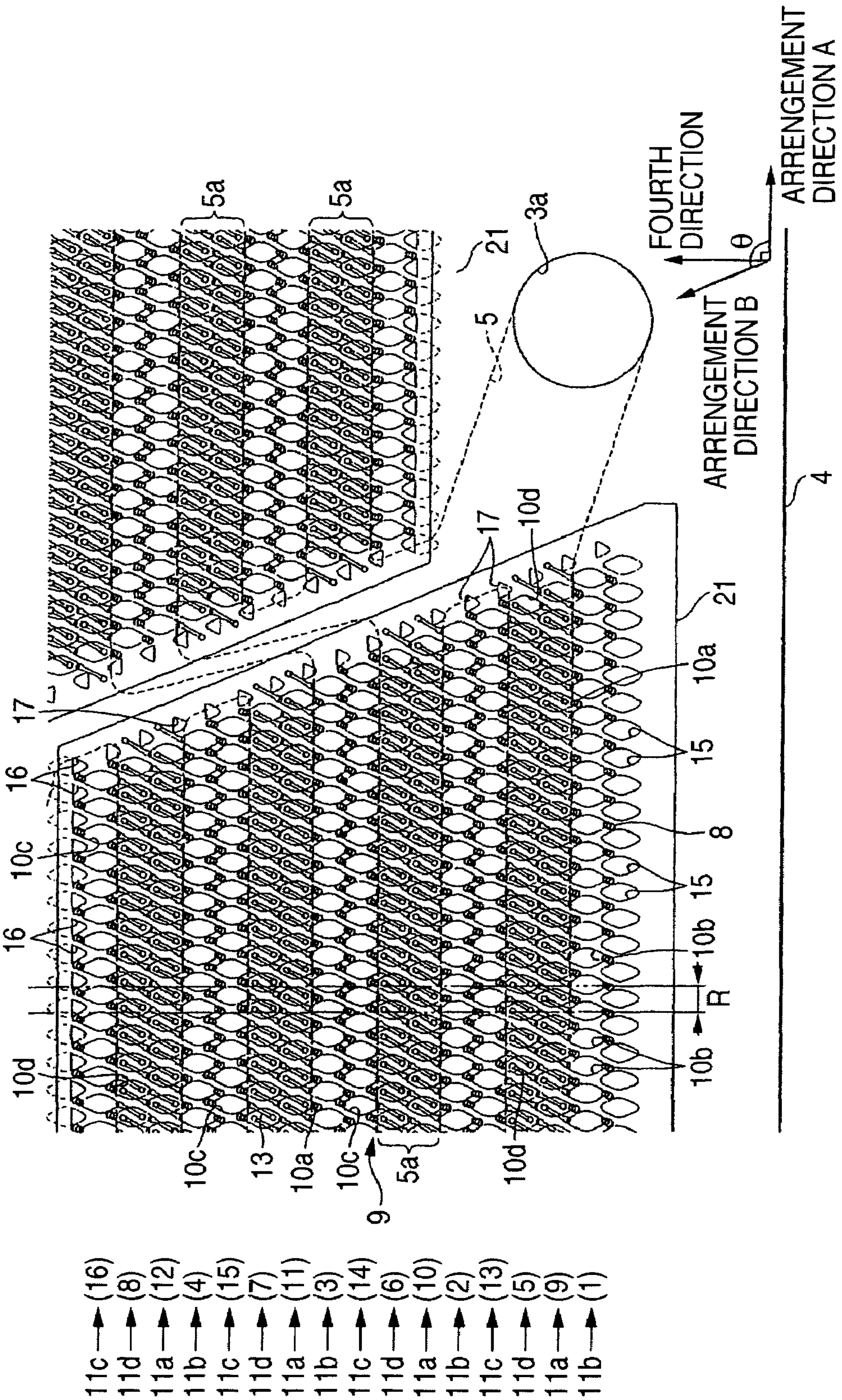
FIG. 4 is an enlarged view of a region surrounded by the one-dot chain line in FIG. 3.
Figure 5:
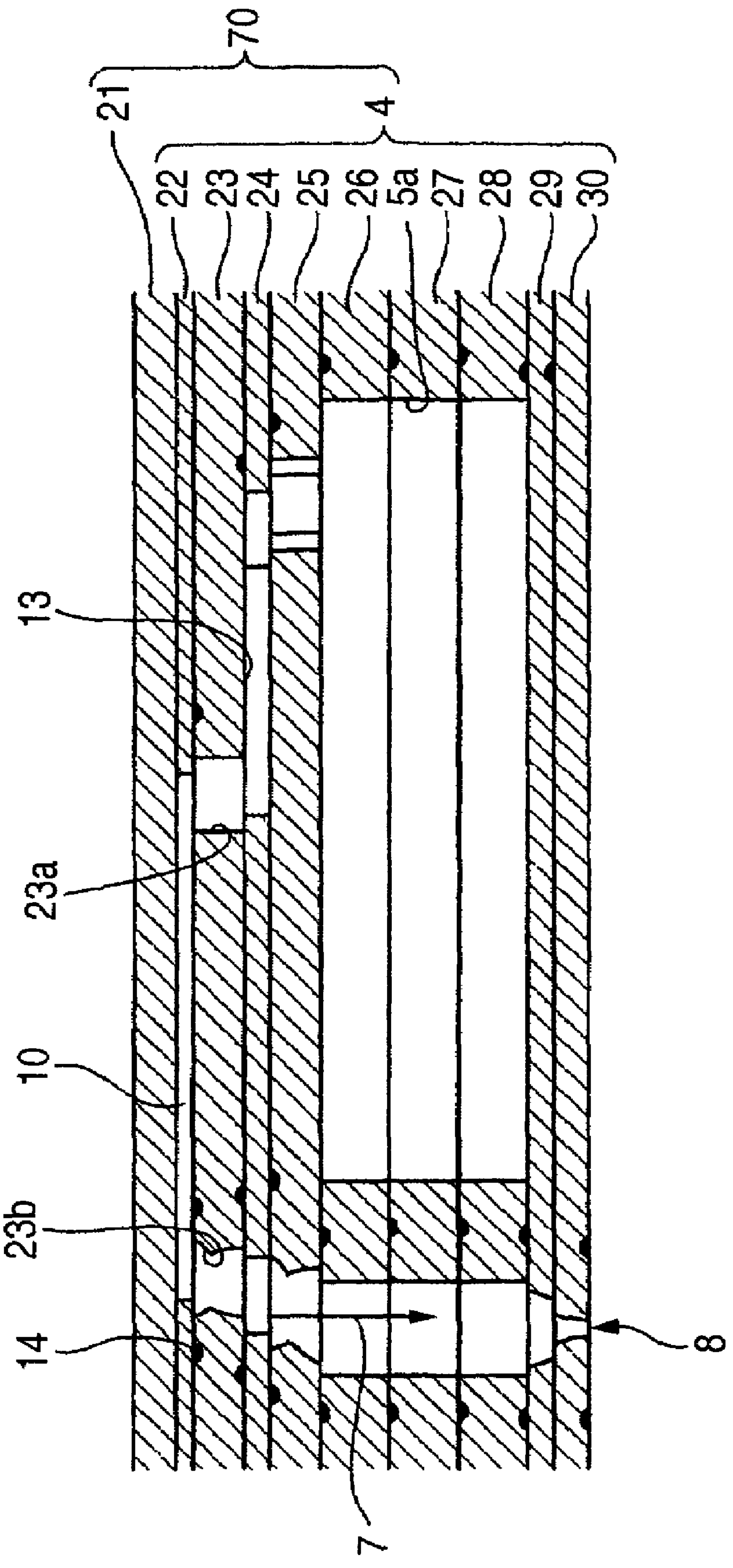
FIG. 5 is a sectional view of part of the head body depicted in FIG. 3 and corresponding to a pressure chamber.

FIG. 4 is an enlarged view of a region surrounded by the one-dot chain line in FIG. 3. As shown in FIG. 4, four sub-manifold flow paths 5*a* parallel to the lengthwise direction of the flow path unit 4 extend in the flow path unit 4 facing the actuator unit 21. A large number of individual ink flow paths each ranging from a corresponding outlet to a corresponding nozzle 8 are connected to each sub-manifold flow path 5*a*. FIG. 5 is a sectional view showing each individual ink flow path. As is obvious from FIG. 5, each nozzle 8 communicates with a corresponding sub-manifold flow path 5*a* through a pressure chamber 10 and an aperture, that is, a daiphragm 13. In this manner, individual ink flow paths 7 each ranging from an outlet of a corresponding sub-manifold flow path 5*a* to a corresponding nozzle 8 through an aperture 13 and a pressure chamber 10 are formed for each pressure chambers 10 in the head body 70.

<Sectional Structure of Head>

As is obvious from FIG. 5, the head body 70 has a laminated structure in which ten sheet members in total, namely, an actuator unit 21, a cavity plate 22, a base plate 23, an aperture plate 24, a supply plate 25, manifold plates 26, 27 and 28, a cover plate 29 and a nozzle plate 30 are laminated on one another in descending order. The ten sheet members except the actuator unit 21, that is, nine sheet plates form the flow path unit 4.

As will be described later in detail, the actuator unit 21 includes a laminate of four piezoelectric sheets 41 to 44 (see FIG. 7) as four layers, and electrodes disposed so that the uppermost one of the four layers is provided as a layer having portions serving as active portions at the time of application of electric field (hereinafter referred to as "active portion-including layer") while the residual three layers are provided as non-active layers, that is, layers not including the active portions. The cavity plate 22 is a metal plate in which a large number of rhomboid holes for forming spaces of the pressure chambers 10 are provided in a laminating range of the actuator unit 21. The base plate 23 is a metal plate which has holes 23*a* each for connecting one pressure chamber 10 of the cavity plate 22 to a corresponding aperture 13, and holes 23*b* each for connecting the pressure chamber 10 to a corresponding nozzle 8.

The aperture plate 24 is a metal plate, which has holes serving as apertures 13 and holes each for connecting one pressure chamber 10 of the cavity plate 22 to a corresponding nozzle 8. The supply plate 25 is a metal plate, which has holes each for connecting an aperture 13 concerning one pressure chamber 10 of the cavity plate 22 to a corresponding sub-manifold flow path 5*a* and holes each for connecting the pressure chamber 10 to a corresponding nozzle 8. The manifold plates 26, 27 and 28 are metal plates, which have the sub-manifold flow paths 5*a*, and holes each for connecting one pressure chamber 10 of the cavity plate 22 to a corresponding nozzle 8. The cover plate 29 is a metal plate, which has holes each for connecting one pressure chamber 10 of the cavity plate 22 to a corresponding nozzle 8. The nozzle plate 30 is a metal plate which has nozzles 8 each provided for one pressure chamber 10 of the cavity plate 22.

The ten sheets 21 to 30 are laminated while positioned so that individual ink flow paths 7 are formed as shown in FIG. 5. Each individual ink flow path 7 first goes upward from the sub-manifold flow path 5*a*, extends horizontally in the aperture 13, goes further upward from the aperture 13, extends horizontally again in the pressure chamber 10, goes obliquely downward in the direction of departing from the aperture 13 for a while and goes vertically downward to the nozzle 8.

As is obvious from FIG. 5, the pressure chamber 10 and the aperture 13 are provided so as to be different in level from each other in the direction of lamination of respective plates. Accordingly, as shown in FIG. 4, in the flow path unit 4 facing the actuator unit 21, the aperture 13 connected to one pressure chamber 10 can be disposed in the same position as that of another pressure chamber 10 adjacent to the one pressure chamber 10 in plan view. As a result, the pressure chambers 10 can be disposed densely and closely, so that printing of a high-resolution image can be achieved by the inkjet head 1 though the inkjet head 1 has a relatively small occupied area.

Escape grooves 14 through which a surplus of the adhesive agent flows out are provided in upper and lower surfaces of the base plate 23 and the manifold plate 28, upper surfaces of the supply plate 25 and the manifold plates 26 and 27 and a lower surface of the cover plate 29 so that openings formed in junction surfaces between the respective plates are surrounded by the escape grooves 14 respectively. The presence of the escape grooves 14 can prevent variation in flow path resistance from being caused by projection of the adhesive agent into each individual ink flow path when the respective plates are bonded to one another.

<Details of Flow Path Unit>

Referring back to FIG. 4, a pressure chamber group 9 including a large number of pressure chambers 10 is formed in a laminating region of each actuator unit 21. The pressure chamber group 9 has a trapezoidal shape with a size substantially equal to that of the laminating region of the actuator unit 21. Such pressure chamber groups 9 are formed for the actuator units 21 respectively.

As is obvious from FIG. 4, each of pressure chambers 10 belonging to a pressure chamber group 9 is connected to a nozzle 8 at one end of a long diagonal line of the pressure chamber 10 and connected to a sub-manifold flow path 5*a* through an aperture 13 at the other end of the long diagonal line. As will be described later, individual electrodes 35 (see FIGS. 6 and 7) each shaped like a rhomboid in plan view and a size smaller than each pressure chamber 10 are arranged in the form of a matrix on the actuator unit 21 so as to be opposite to the pressure chambers 10. Incidentally, in FIG. 4, the nozzles 8, the pressure chambers 10 and the apertures 13 to be drawn by broken lines in the flow path unit 4 are drawn by solid lines for the sake of facilitating understanding of the drawing.

The pressure chambers 10 are arranged adjacently in the form of a matrix in two arrangement directions A and B (first and second directions). The arrangement direction A is a lengthwise direction of the inkjet head 1, that is, a direction of extension of the flow path unit 4. The arrangement direction A is parallel to a short diagonal line of each pressure chamber 10. The arrangement direction B is a direction of one oblique side of each pressure chamber 10 so that an obtuse angle θ is formed between the arrangement direction B and the arrangement direction A. Each of two acute angle portions of each pressure chamber 10 is located between two other pressure chambers adjacent to the pressure chamber.

The pressure chambers 10 disposed adjacently in the form of a matrix in the two arrangement directions A and B are formed at intervals of a distance corresponding to 37.5 dpi along the arrangement direction A. The pressure chambers 10 are formed so that sixteen pressure chambers 10 are arranged in the arrangement direction B in one actuator unit 21.

The large number of pressure chambers 10 disposed in the form of a matrix form a plurality of pressure chamber columns along the arrangement direction A shown in FIG. 4. The pressure chamber columns are separated into first pressure chamber columns 11*a*, second pressure chamber columns 11*b*, third pressure chamber columns 11*c* and fourth pressure chamber columns 11*d* in accordance with positions relative to the sub-manifold flow paths 5*a* viewed from a direction (third direction) perpendicular to a plane of FIG. 4. The first to fourth pressure chamber columns 11*a* to 11*d* are arranged cyclically in order of 11*c*→11*d*→11*a*→11*b*→11*c*→11*d* . . . →11*b* from an upper side to a lower side of each actuator unit 21.

In pressure chambers 10*a* forming a first pressure chamber column 11*a* and pressure chambers 10*b* forming a second pressure chamber column 11*b*, nozzles 8 are unevenly distributed on a lower side of the plane of FIG. 4 in a direction (fourth direction) perpendicular to the arrangement direction A when viewed from the third direction. The nozzles 8 substantially face lower end portions of corresponding pressure chambers 10 respectively. On the other hand, in pressure chambers 10*c* forming a third pressure chamber column 11*c* and pressure chambers 10*d* forming a fourth pressure chamber column 11*d*, nozzles 8 are unevenly distributed on an upper side of the plane of FIG. 4 in the fourth direction. The nozzles 8 substantially face upper end portions of corresponding pressure chambers 10 respectively. In the first and fourth pressure chamber columns 11*a* and 11*d*, regions not smaller than half of the pressure chambers 10*a* and 10*d* overlap the sub-manifold flow paths 5*a* when viewed from the third direction. In the second and third pressure chamber columns 11_b_ and 11_c_, almost the whole regions of the pressure chambers 10_b_ and 10_c_ do not overlap the sub-manifold flow paths 5_a_ when viewed from the third direction. For this reason, pressure chambers 10 belonging to any pressure chamber column can be formed so that the sub-manifold flow paths 5_a_ are widened as sufficiently as possible while nozzles 8 connected to the pressure chambers 10 do not overlap the sub-manifold flow paths 5_a_. Accordingly, ink can be supplied to the respective pressure chambers 10 smoothly.

As shown in FIG. 4, a plurality of circumferential spaces 15 each having the same shape and size as those of the pressure chamber 10 are arranged on a line along a long one of the two parallel sides of the trapezoidal pressure chamber group 9 so as to cover the whole region of the long side. Each circumferential space 15 is formed in such a manner that a hole having the same shape and size as those of each pressure chamber 10 formed in the capacity plate 22 is blocked with the actuator unit 21 and the base plate 23. That is, there is no ink flow path connected to the circumferential spaces 15. Moreover, there is no individual electrode 35 opposite to the circumferential spaces 15. That is, the circumferential spaces 15 are not filled with ink.

A plurality of circumferential spaces 16 are arranged on a line along a short one of the two parallel sides of the trapezoidal pressure chamber group 9 so as to cover the whole region of the short side. In addition, a plurality of circumferential spaces 17 are arranged on a line along each of the two oblique sides of the trapezoidal pressure chamber group 9 so as to cover the whole region of the oblique side. The circumferential spaces 16 and 17 pass through the cavity plate 22 at regions each shaped like a regular triangle in plan view. There is no ink flow path connected to the circumferential spaces 16 and 17. Moreover, there is no individual electrode 35 opposite to the circumferential spaces 16 and 17. That is, like the circumferential spaces 15, the circumferential spaces 16 and 17 are not filled with ink.

<Details of Actuator Unit>

Next, the configuration of the actuator unit 21 will be described. A large number of individual electrodes 35 are arranged in the form of a matrix on the actuator unit 21 so as to have the same pattern as that of the pressure chambers 10. Each individual electrode 35 is arranged in a position opposite to a corresponding pressure chamber 10 in plan view.

Figure 6:
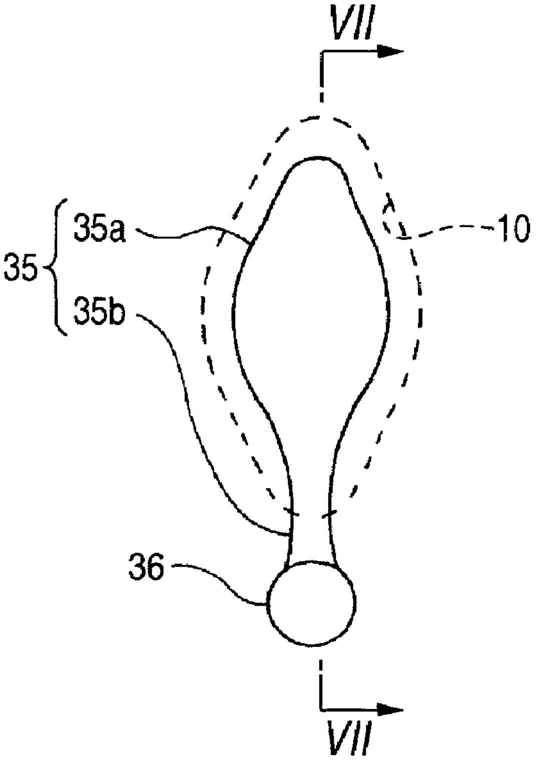
FIG. 6 is a plan view of an individual electrode formed on an actuator unit depicted in FIG. 3.

FIG. 6 is a plan view of an individual electrode 35. As shown in FIG. 6, the individual electrode 35 includes a primary electrode region 35_a_, and a secondary electrode region 35_b_. The primary electrode region 35_a_ is arranged in a position opposite to the pressure chamber 10 and received in the pressure chamber 10 in plan view. The secondary electrode region 35_b_ is connected to the primary electrode region 35_a_ and arranged in a position opposite to the outside of the pressure chamber 10.

Figure 7:
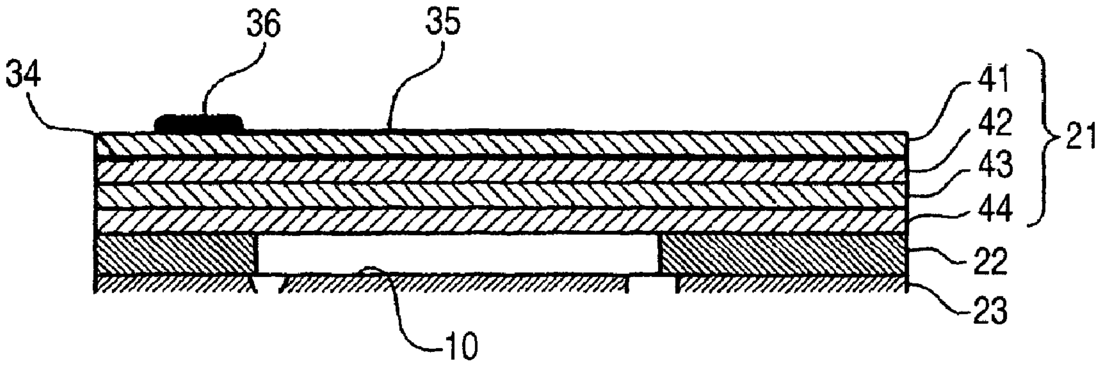
FIG. 7 is a sectional view of part of the actuator unit depicted in FIG. 3.

FIG. 7 is a sectional view taken along the line VII-VII in FIG. 6. As shown in FIG. 7, the actuator unit 21 includes four piezoelectric sheets 41, 42, 43 and 44 formed to have a thickness of about 15 μm equally. The piezoelectric sheets 41 to 44 are provided as stratified flat plates (continuous flat plate layers) which are continued to one another so as to be arranged to cover a large number of pressure chambers 10 formed in one ink jet region in the head body 70. Because the piezoelectric sheets 41 to 44 are arranged as continuous flat plate layers covering the large number of pressure chambers 10, the individual electrodes 35 can be disposed densely on the piezoelectric sheet 41 when, for example, a screen printing technique is used. Accordingly, the pressure chambers 10 formed in positions corresponding to the individual electrodes 35 can be also disposed densely, so that a high-resolution image can be printed. Each of the piezoelectric sheets 41 to 44 is made of a ceramic material of the lead zirconate titanate (PZT) type having ferroelectricity.

As shown in FIG. 6, each of the primary electrode regions 35_a_ of the individual electrodes 35 formed on the piezoelectric sheet 41 as the uppermost layer has a rhomboid planar shape approximately similar to that of the pressure chamber 10. A lower acute angle portion of the rhomboid primary electrode region 35_a_ extends outward so as to be connected to the secondary electrode region 35_b_ opposite to the outside of the pressure chamber 10. A circular land portion 36 electrically connected to the individual electrode 35 is provided at an end of the secondary electrode region 35_b_. As shown in FIG. 7, the land portion 36 is disposed opposite to a region of the cavity plate 22 in which there is no pressure chamber 10 formed. For example, the land portion 36 is made of gold containing glass frit. As shown in FIG. 6, the land portion 36 is bonded onto a surface of the extension of the secondary electrode region 35_b_. Although an FPC 50 is not shown in FIG. 7, the land portion 36 is electrically connected to a corresponding contact provided in the FPC 50. For the connection, it is necessary to press the contact of the FPC 50 against the land portion 36. Because there is no pressure chamber 10 formed in a region of the cavity plate 22 opposite to the land portion 36, the contact of the FPC 50 and the land portion 36 can be connected to each other steadily by sufficient pressure.

A common electrode 34 having the same outer shape as that of the piezoelectric sheet 41 and having a thickness of about 2 μm is interposed between the piezoelectric sheet 41 as the uppermost layer and the piezoelectric sheet 42 located under the piezoelectric sheet 41. The individual electrodes 35 and the common electrode 34 are made of a metal material such as Ag—Pd.

The common electrode 34 is grounded at a region not shown. Accordingly, in this embodiment, the common electrode 34 is kept at ground potential equally in regions corresponding to all the pressure chambers 10. The individual electrodes 35 are connected to the driver IC 80 through the land portions 36 and the FPC 50 including independent lead wires in accordance with the individual electrodes 35 so that electric potential can be controlled in accordance with each pressure chamber 10.

<Method for Driving Actuator Unit>

Next, a method for driving the actuator unit 21 will be described. The direction of polarization of the piezoelectric sheet 41 in the actuator unit 21 is a direction of the thickness of the piezoelectric sheet 41. That is, the actuator unit 21 has a so-called unimorph type structure in which one piezoelectric sheet 41 on an upper side (i.e., far from the pressure chambers 10) is used as a layer including an active portion while three piezoelectric sheets 42 to 44 on a lower side (i.e., near to the pressure chambers 10) are used as non-active layers. Accordingly, when the electric potential of an individual electrode 35 is set at a predetermined positive or negative value, an electric field applied portion of the piezoelectric sheet 41 put between electrodes serves as an active portion (pressure generation portion) and shrinks in a direction perpendicular to the direction of polarization by the transverse piezoelectric effect if the direction of the electric field is the same as the direction of polarization.

In this embodiment, the portion of the piezoelectric sheet 41 put between the primary electrode region 35_a_ and the common electrode 34 serves as an active portion which generates distortion by the piezoelectric effect when an electric field is applied on the portion. On the other hand, the three piezoelectric sheets 42 to 44 under the piezoelectric sheet 41 little function as active portions because there is no electric field applied on the three piezoelectric sheets 42 to 44 from the outside. For this reason, the portion of the piezoelectric sheet 41 mainly put between the primary electrode region 35*a* and the common electrode 34 shrinks in a direction perpendicular to the direction of polarization by the transverse piezoelectric effect.

On the other hand, the piezoelectric sheets 42 to 44 are not affected by the electric field, so that the piezoelectric sheets 42 to 44 are not displaced spontaneously. Accordingly, a difference in distortion in a direction perpendicular to the direction of polarization is generated between the piezoelectric sheet 41 on the upper side and the piezoelectric sheets 42 to 44 on the lower side, so that the whole of the piezoelectric sheets 41 to 44 is to be deformed so as to be curved convexly on the non-active side (unimorph deformation). On this occasion, as shown in FIG. 7, the lower surface of the actuator unit 21 constituted by the piezoelectric sheets 41 to 44 is fixed to the upper surface of the partition wall (cavity plate) 22 which partitions the pressure chambers. As a result, the piezoelectric sheets 41 to 44 are deformed so as to be curved convexly on the pressure chamber side. For this reason, the volume of the pressure chamber 10 is reduced to increase the pressure of ink to thereby jet ink from a nozzle 8 connected to the pressure chamber 10. Then, when the electric potential of the individual electrode 35 is returned to the same value as the electric potential of the common electrode 34, the piezoelectric sheets 41 to 44 are restored to the original shape so that the volume of the pressure chamber 10 is returned to the original value. As a result, ink is sucked from the sub-manifold flow path 5 side.

Incidentally, another drive method maybe used as follows. The electric potential of each individual electrode 35 is set at a value different from the electric potential of the common electrode 34 in advance. Whenever there is a jetting request, the electric potential of the individual electrode 35 is once changed to the same value as the electric potential of the common electrode 34. Then, the electric potential of the individual electrode 35 is returned to the original value different from the electric potential of the common electrode 34 at predetermined timing. In this case, the piezoelectric sheets 41 to 44 are restored to the original shape at the timing when the electric potential of the individual electrode 35 becomes equal to the electric potential of the common electrode 34. Accordingly, the volume of the pressure chamber 10 is increased compared with the initial state (in which the two electrodes are different in electric potential from each other), so that ink is sucked from the sub-manifold flow path 5 side into the pressure chamber 10. Then, the piezoelectric sheets 41 to 44 are deformed so as to be curved convexly on the pressure chamber 10 side at the timing when the electric potential of the individual electrode 35 is set at the original value different from the electric potential of the common electrode 34 again. As a result, the volume of the pressure chamber 10 is reduced to increase the pressure of ink to thereby jet ink.

<Example of Operation at Printing>

Referring back to FIG. 4, a zonal region R having a width (678.0 μm) corresponding to 37.5 dpi in the arrangement direction A and extending in a direction (fourth direction) perpendicular to the arrangement direction A will be considered. Only one nozzle 8 is present in anyone of sixteen pressure chamber columns 11*a* to 11*d* in the zonal region R. That is, when such a zonal region R is formed in an optional position of the ink jet region corresponding to one actuator unit 21, sixteen nozzles 8 are always distributed in the zonal region R. The positions of points obtained by projecting the sixteen nozzles 8 onto a line extending in the arrangement direction A are arranged at intervals of a distance corresponding to 600 dpi which is resolution at the time of printing.

When the sixteen nozzles 8 belonging to one zonal region R are numbered as (1) to (16) in rightward order of the positions of points obtained by projecting the sixteen nozzles 8 onto a line extending in the arrangement direction A, the sixteen nozzles 8 are arranged in ascending order of (1), (9), (5), (13), (2), (10), (6), (14), (3), (11), (7), (15), (4), (12), (8) and (16). When the inkjet head 1 configured as described above is driven suitably in accordance with the carrying of a printing medium in the actuator unit 21, characters, graphics, etc. having resolution of 600 dpi can be drawn.

For example, description will be made on the case where a line extending in the arrangement direction A is printed with resolution of 600 dpi. First, brief description will be made on the case of a reference example in which each nozzle 8 is connected to the acute-angled portion on the same side of the pressure chamber 10. In this case, a nozzle 8 in the pressure chamber column located in the lowermost position in FIG. 6 begins to jet ink in accordance with the carrying of the printing medium. Nozzles 8 belonging to adjacent pressure chamber columns on the upper side are selected successively to jet ink. Accordingly, ink dots are formed so as to be adjacent to one another at intervals of a distance corresponding to 600 dpi in the arrangement direction A. Finally, a line extending in the arrangement direction A is drawn with resolution of 600 dpi as a whole.

On the other hand, in this embodiment, a nozzle 8 in the pressure chamber column 11*b* located in the lowermost position in FIG. 4 begins to jet ink. As the printing medium is carried, nozzles 8 connected to adjacent pressure chambers on the upper side are selected successively to jet ink. On this occasion, the displacement of the nozzle position in the arrangement direction A in accordance with increase in position by one pressure chamber column from the upper side toward to the lower side is not constant. Accordingly, ink dots formed successively along the arrangement direction A in accordance with the carrying of the printing medium are not arranged at regular intervals of 600 dpi.

That is, as shown in FIG. 4, ink is first jetted from the nozzle (1) connected to the pressure chamber column 11*b* located in the lowermost position in FIG. 4 in accordance with the carrying of the printing medium. A row of dots are formed on the printing medium at intervals of a distance corresponding to 37.5 dpi. Then, when the line forming position reaches the position of the nozzle (9) connected to the second lowest pressure chamber column 11*a* as the printing medium is carried, ink is jetted from the nozzle (9). As a result, a second ink dot is formed in a position displaced by eight times as large as the distance corresponding to 600 dpi in the arrangement direction A from the initially formed dot position.

Then, when the line forming position reaches the position of the nozzle (5) connected to the third lowest pressure chamber column 11*d* as the printing medium is carried, ink is jetted from the nozzle (5). As a result, a third ink dot is formed in a position displaced by four times as large as the distance corresponding to 600 dpi in the arrangement direction A from the initially formed dot position. When the line forming position reaches the position of the nozzle (13) connected to the fourth lowest pressure chamber column 11*c* as the printing medium is further carried, ink is jetted from the nozzle (13). As a result, a fourth ink dot is formed in a position displaced by twelve times as large as the distance corresponding to 600 dpi in the arrangement direction A from the initially formed dot position. When the line forming position reaches the position of the nozzle (2) connected to the fifth lowest pressure chamber column 11*b* as the printing medium is further carried, ink is jetted from the nozzle (2). As a result, a fifth ink dot is formed in a position displaced by the distance corresponding to 600 dpi in the arrangement direction A from the initially formed dot position.

Then, ink dots are formed in the same manner as described above while nozzles 8 connected to the pressure chambers 10 are selected successively from the lower side toward the upper side as shown in FIG. 4. When N is the number of a nozzle 8 shown in FIG. 4 on this occasion, an ink dot is formed in a position displaced by a value corresponding to (the ratio n=N−1)×(the distance corresponding to 600 dpi) in the arrangement direction A from the initially formed dot position. Finally, when selection of the sixteen nozzles 8 is completed, fifteen dots formed at intervals of a distance corresponding to 600 dpi are interpolated in between ink dots formed at intervals of a distance corresponding to 37.5 dpi by the nozzle (1) in the lowest pressure chamber column 11*b* in FIG. 4. As a result, a line extending in the arrangement direction A can be drawn with resolution of 600 dpi as a whole.

Incidentally, the neighbor of the two end portions (oblique sides of an actuator unit 21) in the arrangement direction A of each ink jet region is made complementary to the neighbor of the two end portions in the arrangement direction A of an ink jet region corresponding to another actuator unit 21 opposite to the widthwise direction of the head body 70, so that printing can be made with resolution of 600 dpi.

<Method for Producing Inkjet Head>

Figure 8:
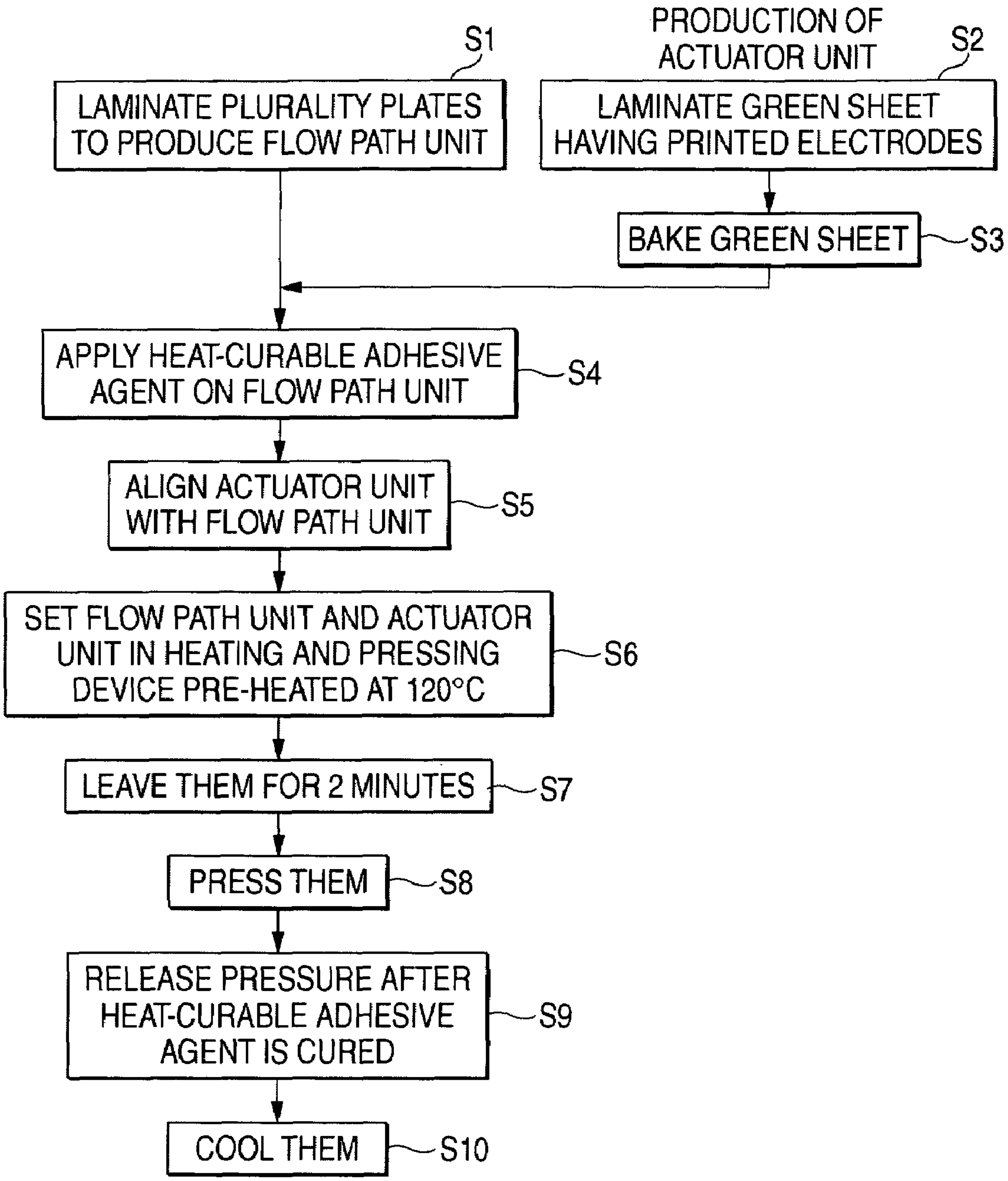
FIG. 8 is a flow chart showing a process of producing the inkjet head according to an embodiment of the invention.

Next, a method for producing the aforementioned inkjet head will be described with reference to FIGS. 8 and FIGS. 9A to 9E. FIG. 8 is a flow chart showing a process of producing the inkjet head 1. FIGS. 9A to 9E are side views showing stepwise the process of producing the inkjet head 1.

To produce the inkjet head 1, parts such as a flow path unit 4, an actuator unit 21, etc. are produced separately and assembled into one body. First, in step 1 (S1), the flow path unit 4 is produced. To produce the flow path unit 4, plates 22 to 30 for forming the flow path unit 4 are etched while masked with patterned photo resists respectively. Thus, holes as shown in FIG. 5 are formed in the plates 22 to 30 respectively. Then, the nine plates 22 to 30 positioned to form individual ink flow paths 7 are stacked through an epoxy heat-curable adhesive agent. The nine plates 22 to 30 are pressed while heated to a temperature not lower than the curing temperature of the heat-curable adhesive agent. As a result, the heat-curable adhesive agent is cured, so that the nine plates 22 to 30 are bonded and fixed to one another. Thus, a flow path unit 4 as shown in FIG. 5 is obtained.

As a modified example, the heat-curable adhesive agent between adjacent ones of the nine plates 22 to 30 may be cured together with the heat-curable adhesive agent between the flow path unit 4 and the actuator unit 21 in a heating process (steps 6 to 9) which will be performed later. In this specification, the nine plates 22 to 30 in a state in which the heat-curable adhesive agent has not been cured yet may be referred to as "flow path unit". Alternatively, the nine plates 22 to 30 may be bonded and fixed to one another by metal welding. Holes in the nozzle plate 30 maybe formed not by etching but by punching or laser machining.

On the other hand, to produce the actuator unit 21, first, a plurality of piezoelectric ceramic green sheets are prepared in step 2 (S2). The green sheets are formed while shrinkage due to sintering is estimated in advance. An electrically conductive paste is screen-printed as a pattern of the common electrode 34 on part of the green sheets. While the green sheets are aligned with one another by a jig, the green sheet on which the electrically conductive paste has been printed as a pattern of the common electrode 34 is put under a green sheet on which the electrically conductive paste is not printed, and two green sheets on which the electrically conductive paste is not printed is put under the printed green sheet.

Then, in step 3 (S3), a laminate obtained by the step 2 is decreased in the same manner as known ceramics and sintered at a predetermined temperature. As a result, the four green sheets form piezoelectric sheets 41 to 44 while the electrically conductive paste forms a common electrode 34. Then, an electrically conductive paste is screen-printed as a pattern of the individual electrodes 35 on the piezoelectric sheet 41 as the uppermost layer. Then, the laminate is heated to thereby sinter the electrically conductive paste to form individual electrodes 35 on the piezoelectric sheet 41. Then, gold containing glass frit is printed on the individual electrodes 35 to thereby form land portions 36. In this manner, the actuator unit 21 as shown in FIG. 7 can be produced. Each of the piezoelectric sheets 41 to 44 has thickness in a range of 20 μm to 100 μm.

As a modified example, after the actuator unit on which the individual electrodes 35 and the land portions 36 have been not formed yet (such a unit may be referred to as "actuator unit" for the sake of convenience in this specification) and the flow path unit 4 are heated and bonded to each other, an electrically conductive paste maybe screen-printed as a pattern of the individual electrodes 35 on the actuator unit and then heated. In this case, the individual electrodes 35 can be formed with high positional accuracy while the individual electrodes 35 are disposed opposite to the pressure chambers 10 formed in the flow path unit. Alternatively, a laminate obtained in such a manner that a green sheet on which an electrically conductive paste has been screen-printed as a pattern of the individual electrodes 35 is prepared, that a green sheet on which an electrically conductive paste has been printed as a pattern of the common electrode 34 is put under the prepared green sheet, and that two green sheets on which an electrically conductive paste is not printed are put under the second upper green sheet, may be heated. In this case, because a pattern of the individual electrodes 35 is printed and formed in advance, the actuator unit can be formed by one heating step.

Incidentally, the flow path unit producing process shown in the step 1 and the actuator unit producing process shown in the steps 2 and 3 are performed independently. Accordingly, either of the two processes may be performed earlier or both the two processes may be performed in parallel to each other.

Figure 9A:
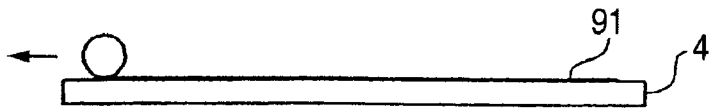
FIGS. 9A to 9E are side views showing stepwise the process of producing the inkjet head depicted in FIG. 1.

Then, in step 4 (S4), an epoxy heat-curable adhesive agent having a heat-curing temperature of about 80° C. is applied on a surface of the flow path unit 4, which is obtained in the step 1 and has a large number of concave portions corresponding to the pressure chambers, by transferring the heat-curable adhesive agent with using a bar coater. For example, a two-component type adhesive agent is used as the heat-curable adhesive agent. FIG. 9A shows a state in which a winding rod 101 of the bar coater moves on the flow path unit 4 in the direction of the arrow in FIG. 9A. As shown in FIG. 9A, when the bar coater is used, a heat-curable adhesive layer 91 having a uniform thickness is formed on the flow path unit 4.

Figure 9B:
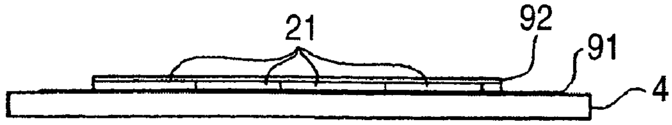

Then, in step 5 (S5), four actuator units 21 are put on the heat-curable adhesive layer 91, as shown in FIG. 9B. On this occasion, each actuator unit 21 is positioned relative to the flow path unit 4 so that the active portions are disposed to face the pressure chambers 10. The positioning is performed on the basis of alignment marks (not shown) formed on the flow path unit 4 and the actuator units 21 in the production process (steps 1 to 3) in advance. Then, a resin sheet 92 such as NAFLON (registered trademark) is put as a cushioning member on the actuator units 21.

Figure 9C:
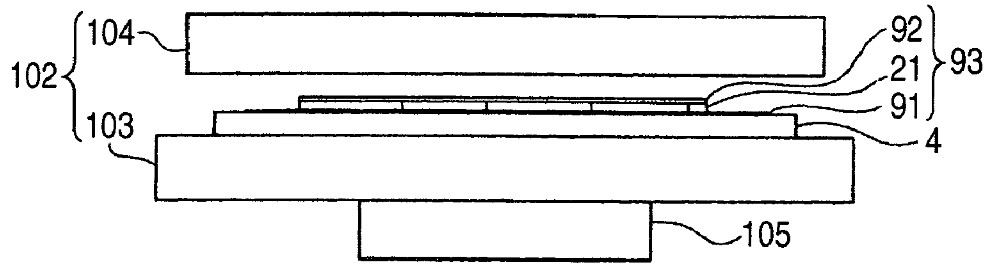

Then, in step 6 (S6), the laminate 93 of the flow path unit 4, the heat-curable adhesive layer 91, the actuator units 21 and the resin sheet 92 is put on the lower jig 103 of the pressing and heating device 102 as shown in FIG. 9C. The lower and upper jigs 103 and 104 of the pressing and heating device 102 have heaters (not shown) in their insides respectively. Accordingly, when a current to each heater is switched on/off, each of the lower and upper jigs 103 and 104 can be kept at a desired temperature. In the step 6, the lower and upper jigs 103 and 104 are pre-heated to 120° C. The position of the upper jig 104 is fixed whereas the lower jig 103 supported by the air cylinder 105 can move up/down in a direction of changing the distance from the upper jig 104. Accordingly, the pressing and heating device 102 is formed in such a manner that the member disposed on the lower jig 103 is clamped between the lower and upper jigs 103 and 104 so that a desired pressure can be applied on the member disposed on the lower jig 103 while the member is heated. In the step 6, because the lower jig 103 is fixed to the lower position, the upper jig 104 is separate from the laminate 93 put on the lower jig 103. Incidentally, in this case, when the stopper position of the air cylinder 105 is made variable, the distance between the laminate 93 and the upper jig 104 can be narrowed as sufficiently as possible to improve heating efficiency.

After the laminate 93 is put on the lower jig 103, the laminate 93 is left for 120 seconds without being clamped between the lower and upper jigs 103 and 104 while the temperature of the lower and upper jigs 103 and 104 is kept at 120° C. (step 7 (S7)).

Figure 10:
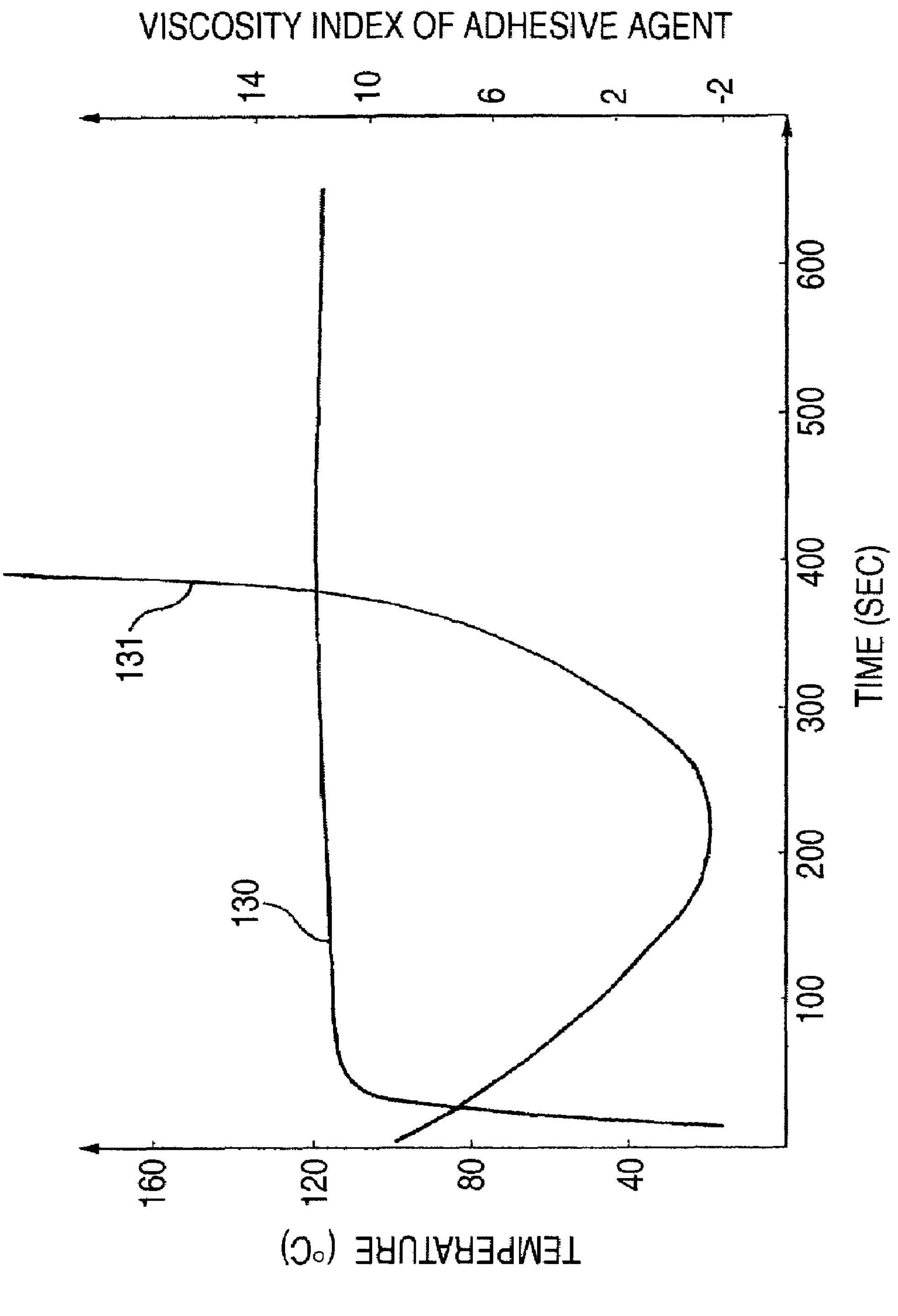
FIG. 10 is a graph showing a state in which the temperature of each actuator unit and the viscosity index of a heat-curable adhesive layer change after the heating start time.

When the laminate 93 is put on the lower jig 103 kept at 120° C., the temperature of the flow path unit 4, the actuator units 21 and the heat-curable adhesive layer 91 constituting the laminate 93 begins to increase. The viscosity of the heat-curable adhesive layer 91 changes gradually according to the temperature rise. The curve 130 in FIG. 10 shows a state in which the temperature of the actuator units 21 changes after the point of time when the laminate 93 is put on the lower jig 103 kept at 120° C. The curve 131 shows a state in which the viscosity index of the heat-curable adhesive layer 91 changes. As is obvious from the curve 130, the temperature of the laminate 93 reaches about 120° C. in a short time of about 50 seconds because the temperature of the laminate 93 rises rapidly just after the laminate 93 is put on the lower jig 103. On the other hand, as is obvious from the curve 131, the viscosity of the heat-curable adhesive layer 91 begins to decrease just after the start of heating the laminate 93 and changes to increase after a time of about 200 seconds has passed. Accordingly, at a point of time when the temperature of the laminate 93 reaches about 120° C., the heat-curable adhesive layer 91 has not been cured yet.

As the temperature of the laminate 93 increases, the respective laminated members thermally expand separately. In this embodiment, the flow path unit 4 and the actuator units 21 constituting the laminate 93 reach their maximum lengths in the case where they are heated to 120° C., at a point of time when a time of about 50 seconds has passed after the start of heating. On this occasion, because the laminate 93 has not been pressed yet and the heat-curable adhesive layer 91 has not been cured yet, the actuator units 21 including piezoelectric sheets considerably lower in thermal expansion coefficient than the flow path unit 4 are not pulled by the flow path unit 4 so that the actuator units 21 expand regardless of the expansion of the flow path unit 4. Accordingly, the flow path unit 4 and each actuator unit 21 expand in accordance with their thermal expansion coefficients respectively, so that the amount of expansion of each actuator unit 21 little varies according to the position.

Figure 9D:
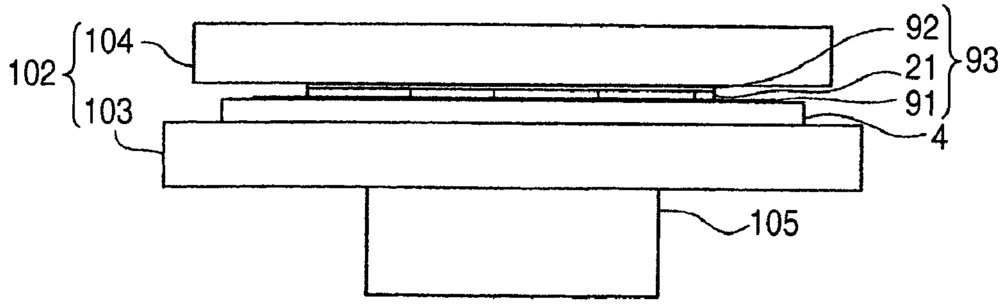

When a time of 120 seconds has passed after the start of heating the laminate 93, in step 8, the air cylinder 105 is driven to move up the lower jig 103. Consequently, as shown in FIG. 9D, the laminate 93 is clamped between the lower and upper jigs 103 and 104 so that a predetermined pressure is applied on the laminate 93. On this occasion, the heat-curable adhesive layer 91 has not been cured yet. When the laminate 93 is pressed, the thickness of the heat-curable adhesive layer 91 sandwiched between the flow path unit 4 and each actuator unit 21 is set at a small value equalized without any difference according to the position and without any individual difference. The temperature of the lower and upper jigs 103 and 104 is kept at 120° C. during the pressing process. Incidentally, the resin sheet 92 as a cushioning member included in the laminate 93 works to disperse external pressure generated by the air cylinder 105 and apply it on the whole of the laminate 93 evenly. That is, the resin sheet 92 contributes to equalization of the thickness of the heat-curable adhesive layer 91.

When the temperature of the lower and upper jigs 103 and 104 is set at 120° C., the period from the start of heating the laminate 93 to the start of pressing the laminate 93 may be selected to be not shorter than 50 seconds at which the flow path unit 4 and each actuator unit 21 reach their maximum lengths respectively, and not longer than 300 seconds at which the heat-curable adhesive layer 91 reaches a certain hardness due to the start of the curing reaction. Moreover, it is preferable that pressing starts before the time of 200 seconds at which the viscosity of the heat-curable adhesive agent is minimized. In this manner, the thickness of the heat-curable adhesive layer 91 in accordance with the predetermined pressure can be obtained with good reproducibility.

According to another embodiment, the pressing of the laminate 93 may be begun after a temperature of the laminate 93 (the flow path unit 4 and the actuator unit 21) is saturated and before viscosity index of the heat-curable adhesive agent reaches a minimum. If the temperature of the lower and upper jigs 103 and 104 is set at 120° C., the pressing of the laminate 93 may be begun at 50 seconds to 200 seconds from the start of heating the laminate 93 as apparent from FIG. 10.

Figure 9E:
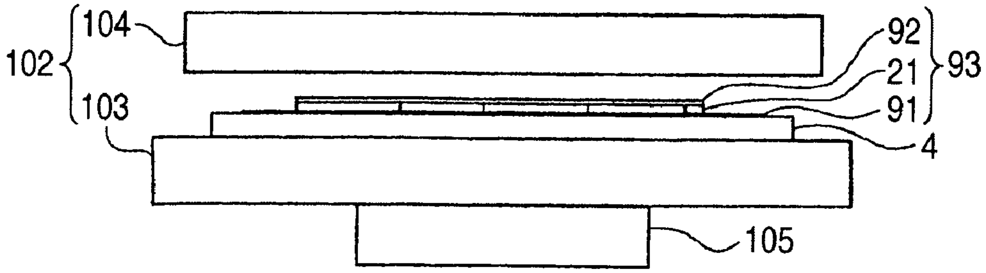

The pressing process is carried out until a time of about 400 seconds has passed after the heating start time. Accordingly, as is obvious from the curve 131, the heat-curable adhesive layer 91 is cured in the pressing process so that the flow path unit 4 and each actuator unit 21 can be fixed by the adhesive portion to prevent displacement at the time of releasing the pressure even in the case where the heat-curable adhesive layer 91 is cooled. After a time of about 400 seconds has passed, the air cylinder 105 is driven reversely to thereby move down the lower jig 103 as shown in FIG. 9E. As a result, the pressure applied on the laminate 93 is released (step 9).

Then, in step 10, in the condition that the pressure applied on the laminate 93 is released, the laminate 93 is cooled so that its temperature is reduced to an ordinary temperature. In this embodiment, cooling is made in such a manner that the laminate 93 is left naturally. In the process of natural cooling, the flow path unit 4 and each actuator unit 21 constituting the laminate 93 are going to shrink. On this occasion, because the flow path unit 4 and each actuator unit 21 are bonded by the cured heat-curable adhesive layer 91 so as not to be displaced, the two shrink by almost the same length regardless of the difference in thermal expansion coefficient. As described above, at the time of temperature rise due to heating, the respective members constituting the laminate 93 expand freely, so that the respective members are fixed almost without difference in amount of expansion according to the position. For this reason, compression stress included in each actuator unit 21 after the temperature returns to an ordinary temperature little varies according to the position.

Then, a process of bonding the FPCs 50, or the like, is carried out. Thus, the aforementioned inkjet head 1 is accomplished.

Figure 11:
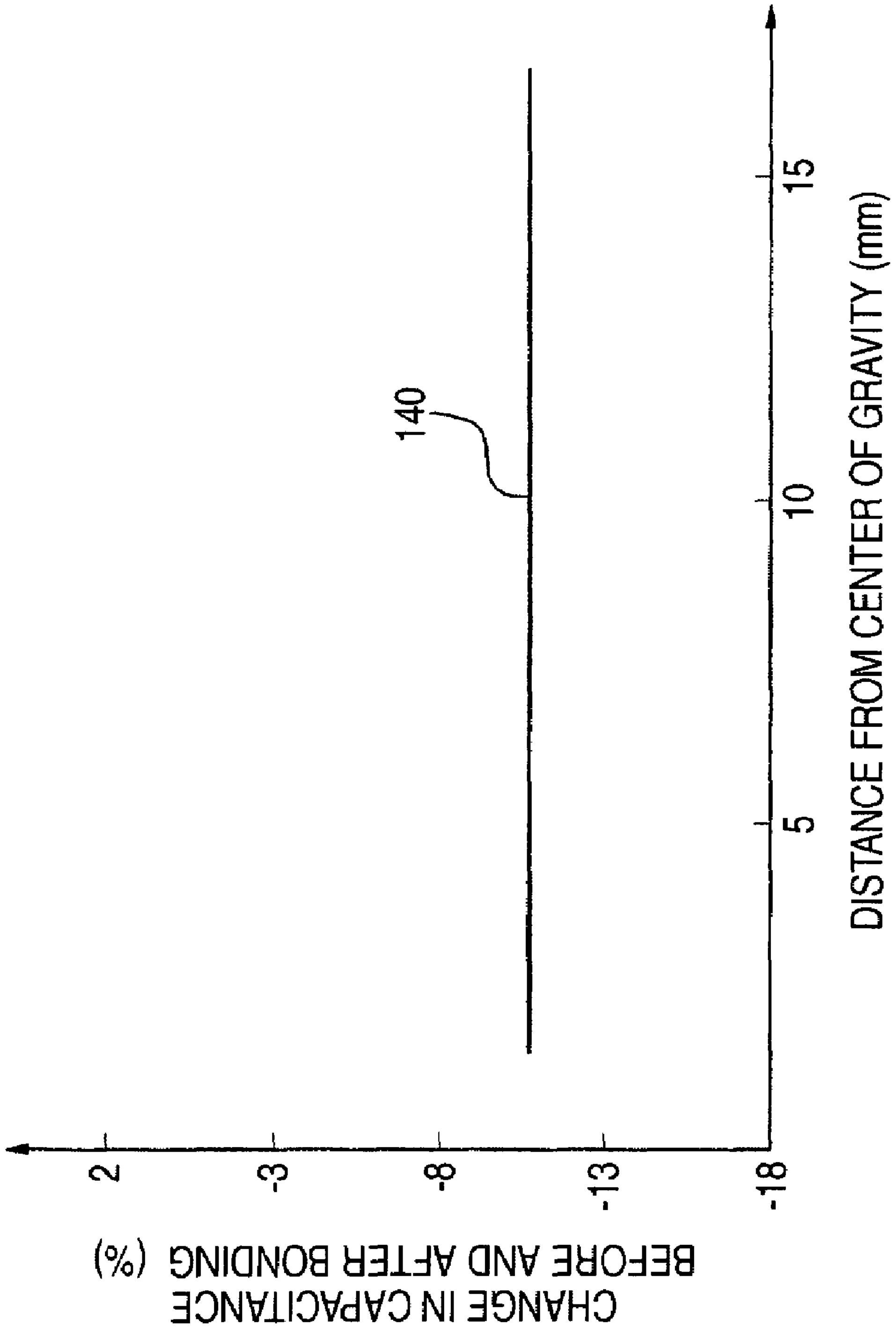
FIG. 11 is a graph showing the relation between the distance from the center of gravity of the actuator unit and change (%) in capacitance of each active portion before and after bonding in the inkjet head depicted in FIG. 1.
Figure 12:
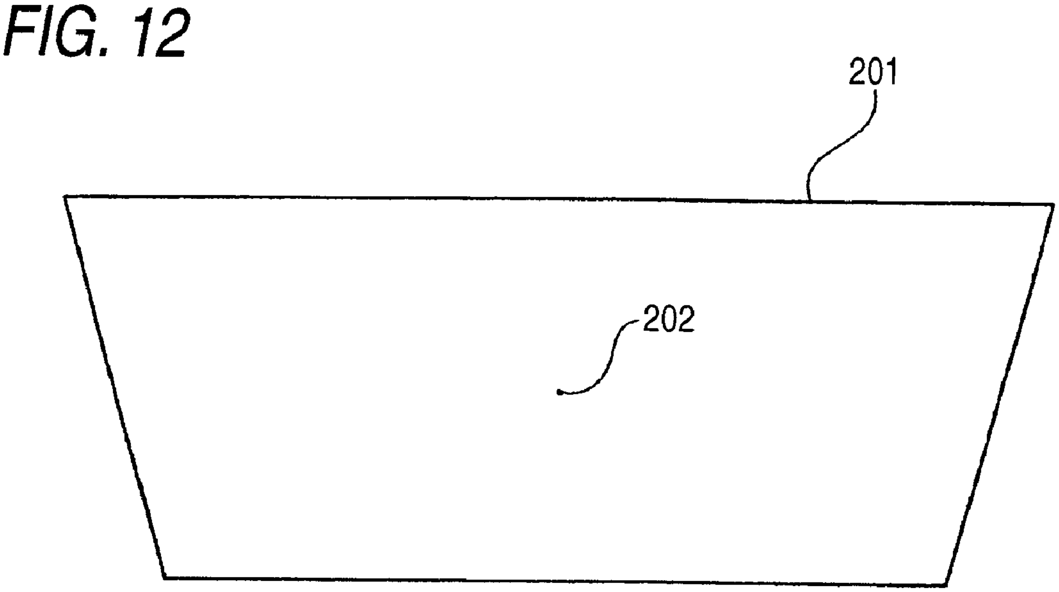
FIG. 12 is a plan view of an actuator unit included in an inkjet head described in JP-A-2003-237078.
Figure 13:
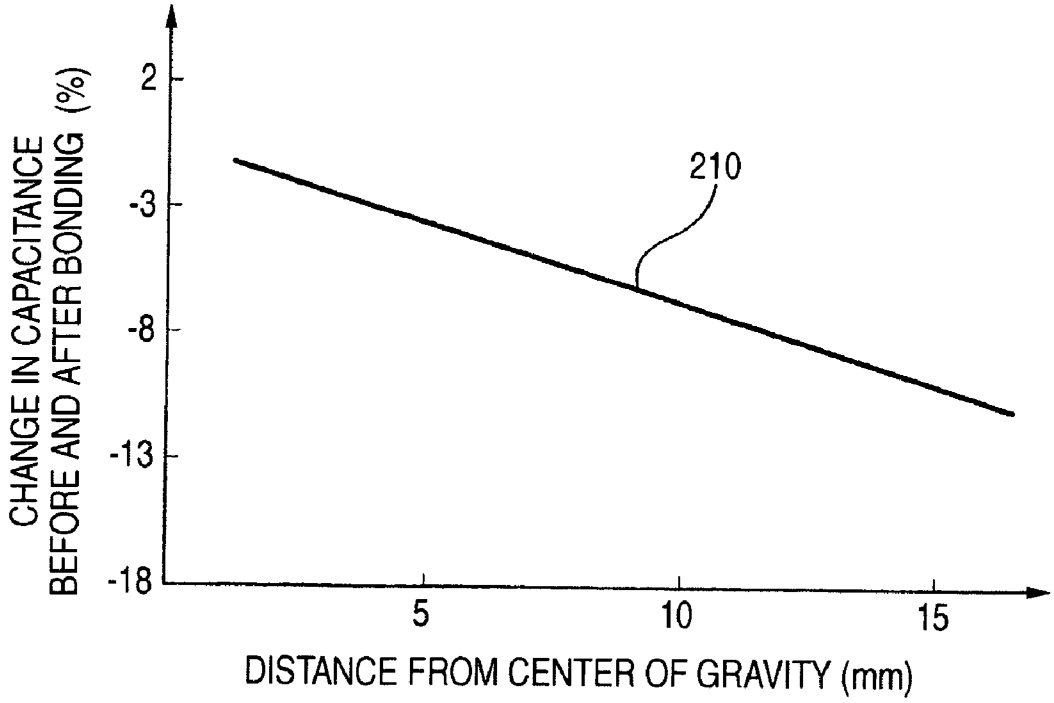
FIG. 13 is a graph showing the relation between the distance from the center of gravity of the actuator unit and change (%) in capacitance of each active portion before and after bonding in the inkjet head described in JP-A-2003-237078.

FIG. 11 is a graph like FIG. 13 and showing the relation between the distance from the center of gravity of an actuator unit 21 and change (%) in capacitance of each active portion before and after bonding in the inkjet head 1 produced according to this embodiment. As shown by the curve 140 in FIG. 11, in the inkjet head 1 produced as described above, reduction in capacitance due to inclusion of compression stress is observed but change (%) in capacitance little depends on the distance from the center of gravity. Accordingly, the speed of ink jetted from a large number of nozzles 8 included in a region opposite to one actuator unit 21 little varies. Consequently, the quality of an image printed by the inkjet head 1 can be improved greatly.

Because relatively large compression stress is included in each actuator unit 21 regardless of the position, the actuator unit 21 hardly cracks even if a high tensile force were applied on the actuator unit 21 in the production process. Consequently, the production yield of the actuator units 21 can be improved.

Figure 14:
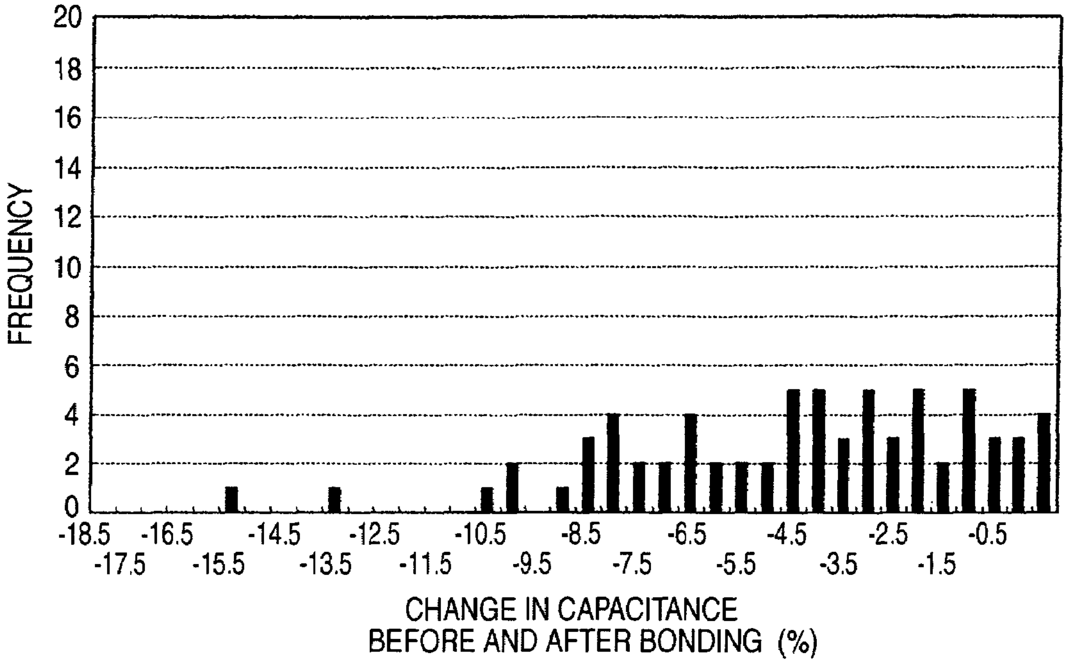
FIG. 14 shows distribution of change (%) in capacitance of each active portion before and after bonding when an inkjet head is produced according to JP-A-2003-237078.
Figure 15:
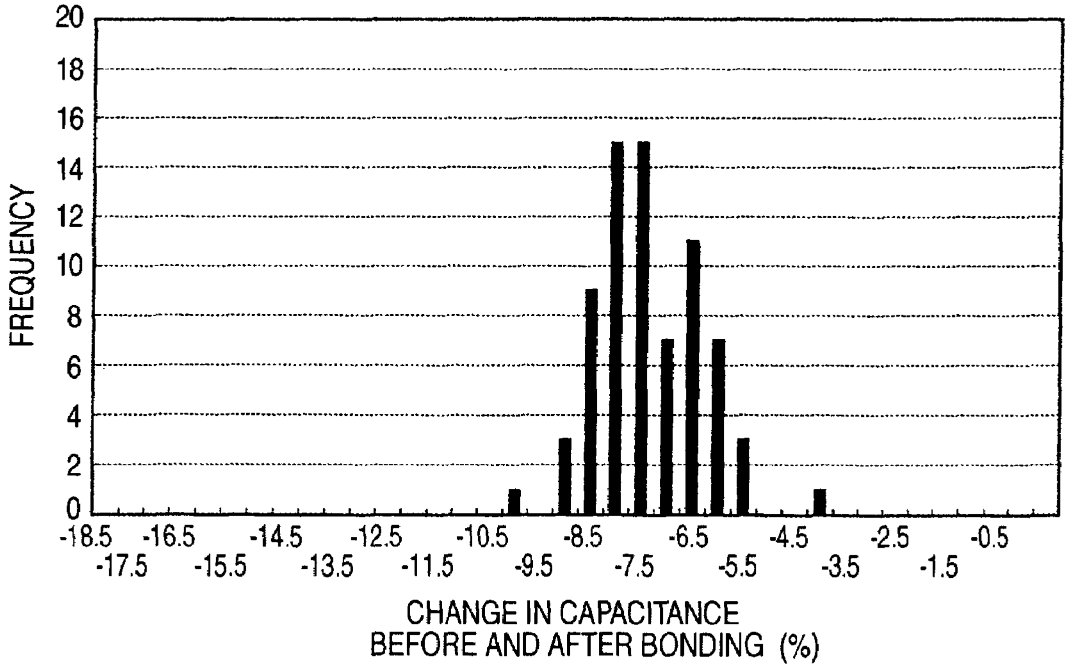
FIG. 15 shows distribution of change (%) in capacitance of each active portion before and after bonding when an inkjet head is produced according to the embodiment as described above.

FIG. 14 shows distribution of change (%) in capacitance of each active portion before and after bonding when an inkjet head is produced according to JP-A-2003-237078. FIG. 15 shows distribution of change (%) in capacitance of each active portion before and after bonding when an inkjet head is produced according to the embodiment as described above. In FIGS. 14 and 15, 0% of change in capacitance of an active portion before and after bonding represents that the capacitance of the active portion does not change before and after bonding. In the inkjet head according to JP-A-2003-237078, an average of the change in capacitance is −4.9%, and a standard deviation a of the change in capacitance is 3.5%. On the other hand, in the inkjet head according to the embodiment, an average of the change in capacitance is −8.1%, and a standard deviation a is 1.0%. The standard deviation of the change in capacitance according to the embodiment is lower than one third of that according to JP-A-2003-237078. That is, the embodiment set forth above can suppress variations of change in capacitance of each active portion before and after bonding. Accordingly, the speed of ink jetted from a large number of nozzles 8 included in a region opposite to one actuator unit 21 little varies. Consequently, the quality of an image printed by the inkjet head 1 can be improved greatly.

The average of the changes in capacitance (−8.1%) is not so large. Therefore, roughly speaking, in the inkjet head according to the embodiment (after bonding), capacitances of the active portions have standard deviation σ within 1% of an average value of the capacitances of the active portions.

In the aforementioned production method, the temperature of the lower jig 103 is set at 120° C. in advance in the step 6. Accordingly, the laminate 93 can be heated rapidly compared with the case where the lower jig 103 is heated after the laminate 93 is put on the lower jig 103. Accordingly, it is possible to widen the period from the point of time when the flow path unit 4 and each actuator unit 21 reach their maximum sizes at 120° C. to the point of time when the heat-curable adhesive layer 91 is cured. Accordingly, a sufficient margin can be given to the point of time when pressure is applied on the laminate 93 while the lower jig 103 is moved up. Consequently, the inkjet head can be produced easily.

The heating and pressing device 102 is formed so that a desired pressure can be applied on the laminate 93 disposed on the lower jig 103 in the condition that the laminate 93 is clamped between the lower and upper jigs 103 and 104 while the laminate 93 is heated in the step 6. Accordingly, because both heating and pressing the laminate 93 can be performed by the heating and pressing device 102, the equipment necessary for production of the inkjet head 1 can be simplified. Moreover, the laminate 93 can be heated to have a more uniform temperature distribution. Moreover, each actuator unit 21 can be prevented from being slidably displaced from the flow path unit 4 due to reduction in viscosity of the heat-curable adhesive agent at the time of heating. Incidentally, it is important that pressing force in this case is so low as not to limit expansion of the respective members constituting the laminate 93.

In the step 6, the laminate 93 may be put on the lower jig 103 before the lower jig 103 is heated to 120° C. In this that in the aforementioned case.

Also, in the step 6, if the heat-curable adhesive agent has a heat-curing temperature of about 80° C., the lower jig 130 may be heated to a temperature, which is in a range of 80° C. to 160° C.

Although a preferred embodiment of the invention has been described above, the invention is not limited to the aforementioned embodiment and various changes on design may be made within the scope of claims. For example, the resin sheet 92 may be dispensed with. Although the embodiment has been described on the inkjet head in which a large number of pressure chambers and nozzles are arranged in the form of a matrix, the invention may be applied to an inkjet head in which one or two rows of nozzles are arranged. Moreover, the shape of each flow path, the shape of each pressure chamber, etc. may be changed suitably. Although the embodiment has been described on the case where the thermal expansion coefficient of the flow path unit is larger than that of each actuator unit, the relation between the thermal expansion coefficients of the two may be reversed. Although the embodiment has been described on the case where natural cooling is used, forced cooling means due to wind cooling or water cooling may be used from the point of view of cooling the laminate 93 rapidly after bonding.

In the invention, the flow path unit and each actuator unit are produced by different processes, respectively. Accordingly, the flow path unit and each actuator unit may be produced by parallel processing or either of the two may be produced earlier. Although the embodiment has been described on the case where the cooling process is provided after the process of releasing the pressure, the two processes may be carried out simultaneously.

What is claimed is:

1. A method of producing an inkjet head, comprising:

producing a flow path unit that includes a plurality of ink flow paths that reach ink jet nozzles through pressure chambers;

producing an actuator unit that has a thermal expansion coefficient different from that of the flow path unit, includes a piezoelectric ceramic sheet having a size covering the chambers, and gives jetting energy to ink in the pressure chambers;

laminating the flow path unit and the actuator unit to each other through a heat-curable adhesive agent;

heating the flow path unit and the actuator unit to a predetermined temperature, which is equal to or larger than a curing temperature of the heat-curable adhesive agent;

applying pressure on the flow path unit and the actuator unit in a direction of pressing the flow path unit and the actuator unit against each other through the heat-curable adhesive agent, only after the flow path unit and the actuator unit are thermally expanded to maximum sizes at the predetermined temperature and before the heat-curable adhesive agent is cured; and releasing the pressure applied on the flow path unit and the actuator unit after the heat-curable adhesive agent is cured, wherein the flow path unit and the actuator unit are heated at the predetermined temperature until the flow path unit and the actuator unit are thermally expanded to the maximum sizes determined by thermal expansion coefficients of the flow path unit and the actuator unit and the predetermined temperature.

2. The method according to claim 1, further comprising:

cooling the flow path unit and the actuator unit from the predetermined temperature after the releasing of the pressure.

3. The method according to claim 1, wherein the heating comprises bringing the laminate of the flow path unit and the actuator unit into contact with a heating jig pre-heated to the predetermined temperature.

4. The method according to claim 3, wherein the applying of the pressure comprises clamping the laminate between a pair of heating jigs including the heating jig.

5. The method of producing an inkjet head according to claim 1, wherein the laminating comprises:

transferring the heat-curable adhesive agent onto the flow path unit; and aligning the flow path unit and the actuator unit to a predetermined positional relation.

6. The method according to claim 1, wherein the pressure chambers are arranged in a form of a matrix in the flow path unit.

7. The method according to claim 1, wherein the predetermined temperature is in a range of 80° C. to 160° C.

8. The method according to claim 1, wherein the piezoelectric ceramic sheet has thickness in a range of 20 μm to 100 μm.

9. The method according to claim 1, wherein the pressure is applied on the flow path unit and the actuator unit through a resin sheet.

10. A method of producing an inkjet head, comprising:

producing a flow path unit that includes a plurality of ink flow paths that reach ink jet nozzles through pressure chambers;

producing an actuator unit that has a thermal expansion coefficient different from that of the flow path unit, includes a piezo electric ceramic sheet having a size covering the chambers, and gives jetting energy to ink in the pressure chambers;

laminating the flow path unit and an actuator unit to each other through a heat-curable adhesive agent;

heating the flow path unit and the actuator unit to a predetermined temperature, which is equal to or larger than a curing temperature of the heat-curable adhesive agent;

applying pressure on the flow path unit and the actuator unit in a direction of pressing the flow path unit and the actuator unit against each other through the heat-curable adhesive agent, only after the flow path unit and the actuator unit are thermally expanded to maximum sizes at the predetermined temperature and before viscosity index of the heat-curable adhesive agent reaches a minimum; and releasing the pressure applied on the flow path unit and the actuator unit after the heat-curable adhesive agent is cured, wherein the flow path unit and the actuator unit are heated at the predetermined temperature until the flow path unit and the actuator unit are thermally expanded to the maximum sizes determined by thermal expansion coefficients of the flow path unit and the actuator unit and the predetermined temperature.

11. The method according to claim 10, further comprising:

cooling the flow path unit and the actuator unit from the predetermined temperature after the releasing of the pressure.

12. The method according to claim 10, wherein the heating comprises bringing the laminate of the flow path unit and the actuator unit into contact with a heating jig pre-heated to the predetermined temperature.

13. The method according to claim 12, wherein the applying of the pressure comprises clamping the laminate between a pair of heating jigs including the heating jig.

14. The method of producing an inkjet head according to claim 10, wherein the laminating comprises:

transferring the heat-curable adhesive agent onto the flow path unit; and aligning the flow path unit and the actuator unit to a predetermined positional relation.

15. The method according to claim 10, wherein the pressure chambers are arranged in a form of a matrix in the flow path unit.

16. The method according to claim 10, wherein the predetermined temperature is in a range of 80° C to 160° C.

17. The method according to claim 10, wherein the piezoelectric ceramic sheet has thickness in a range of 20 μm to 100 μm.

18. The method according to claim 10, wherein the pressure is applied on the flow path unit and the actuator unit through a resin sheet.

* * * * *